Dec. 31, 1957    N. J. ZAM    2,818,552
BATTERY TERMINAL
Filed June 4, 1954

NICHOLAS J. ZAM.
INVENTOR.

BY *Wm. O. Ballard*

ATTORNEY.

United States Patent Office 2,818,552
Patented Dec. 31, 1957

2,818,552

BATTERY TERMINAL

Nicholas J. Zam, Toledo, Ohio

Application June 4, 1954, Serial No. 434,444

1 Claim. (Cl. 339—116)

This invention relates to electric terminals, more particularly those for engaging the posts of storage batteries.

An object of this invention is to provide an electric lead terminal which may be quickly attached or detached from the terminal post of a storage battery.

Another object of this invention is to provide a quick attachable and detachable lead terminal which may accommodate a wide variety of battery post sizes.

Another object of this invention is to provide a terminal of the type described which may compensate for any wear of the parts resulting from frequent change of connections or other causes.

Another object of this invention is to provide a continuous insulation coating over the entire surfaces of all the exposed portions of the terminal.

And another object of this invention is to provide an insulation sheath for the entire exposed surfaces of the terminal, which sheath is bonded thereto, and which may be continued to encase a predetermined length of an electrical cable attached to the terminal.

Other objects and advantages of this invention relating to the arrangement, operation and functions of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figure 1:
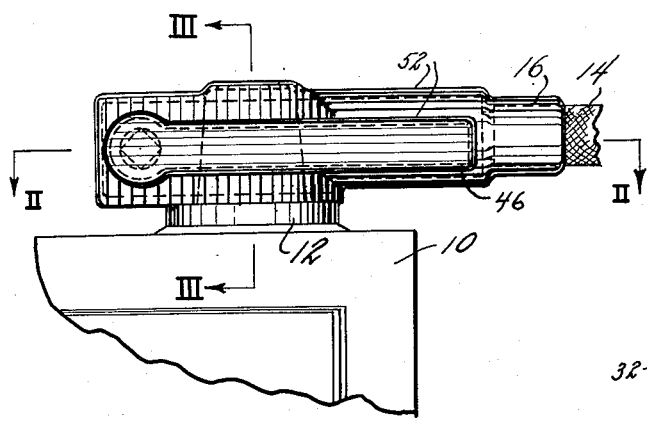
Fig. 1 is a side elevation of a fragment of a storage battery showing a terminal post thereon to which an electrical terminal of the invention herein is attached.
Figure 3:
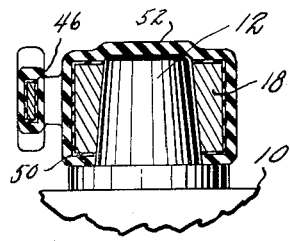
Fig. 3 is a view on the line III—III, Fig. 1.
Figure 4:
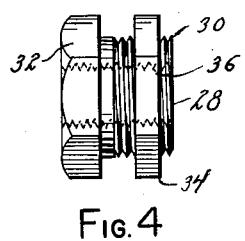
Fig. 4 is a side elevation of the adjusting sleeve embodied in the electrical terminal.
Figure 2:
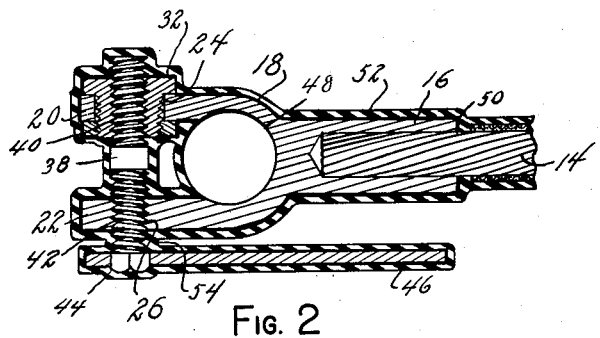
Fig. 2 is a view on the line II—II, Fig. 1.
Figure 5:
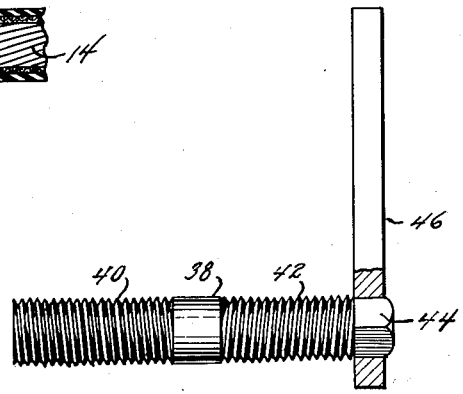
Fig. 5 is a side elevation of the screw element adapted to cooperate with the sleeve of Fig. 4.
Figure 6:
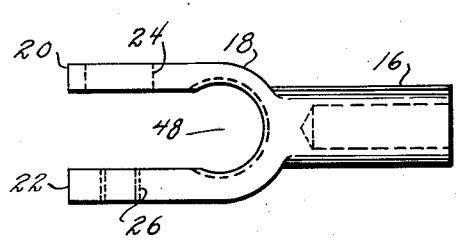
Fig. 6 is a plan view of the body portion of one of the terminals.

Storage battery 10 is provided with terminal post 12, to which a clamp of the invention herein may be attached.

Electrical cable 14 has a terminus embedded in arm 16 outwardly extending from the body 18 of the electrical terminal. This body is of the split clamp type, being bifurcated to provide arms 20, 22 outwardly extending therefrom, preferably in a direction oppositely to the extent of the arm 16. The arm or lug 20 is provided with a smooth bore aperture 24 therethrough, and the arm 22 is provided with threaded aperture 26 therethrough, which is in axial alignment with the aperture 24.

Sleeve element 28 is provided with an exterior threaded portion 30 and polygonal head 32. This sleeve 28 is inserted through the aperture 24 with the head 32 providing a collar abutting the outer face of the arm 20. The sleeve may be locked in such position by means of a nut 34 threaded on the threaded portion 30 to abut the inner side of the arm 20. It will be apparent that by loosening or tightening the nut 34, the sleeve 28 may be selectively positioned and locked within the arm 20.

The sleeve 28 is provided with axial threaded bore 36, which is in axial alignment with the aperture 26 when the sleeve is mounted in the arm 20. The bore 30 and aperture 26 provides a mount for a screw element 38 having a left hand screw providing portion 40 corresponding to the bore 30, and a right hand screw portion 42 engaging the corresponding thread on the interior of the aperture 26. The screw element 38 terminates at one end thereof in a key portion 44, which key portion 44 mounts an operating arm 46. It will be noted that by manipulation of the arm 46, the screw 38 will be rotated with the right and left hand threading thereon and the arms 20, 22 will be forced apart or drawn together, and as drawn together the circular seat 48 in the body 18 will grip the battery post 12 or release the post. The threading 40, 42 is of a different pitch than the threading 30 on the sleeve 28. This allows the screw 38 to be operated without disturbing the adjustment of the sleeve 28, but if the device is subjected to frequent use so that there is wear adjacent the sleeve, the nut 36 may be operated to take up any looseness therein. This provides a very effective quick acting terminal clamp for the electrical lead line 14.

However, regardless of the effectiveness of any clamping on the terminal post of a storage battery, there is a certain amount of oxidation at the post, and the parts adjacent thereto are subject to corrosion. Means are provided herein to permanently protect the clamp against corrosion, which insures a long life and easy operation of the device. To this end, all of the exposed surfaces of the parts are subjected to a sizing coating 50, which coating is carefully applied to all surfaces to be protected and is screened against application against any surfaces not to be so protected, as for example, the inner faces of the seat 48 and any length of the cable 14 beyond the normal extent of corrosion seep. The coated parts are then dipped into liquid butanol, which adheres to all faces having received the primer coat. A single dip may be sufficient, or the parts may be dipped a plurality of times to increase the thickness of the butanol overcoating. The coated unit is then subjected to a baking process, which baking process is of a temperature and duration of time to set the coating into a substantially self-sustaining sheath, yet retaining a high degree of flexibility. A sheath 52 is thus produced covering all the exposed surfaces of the clamp, the operating elements thereof, and bridging adjacent portions.

The sheath 52 is bonded to the metallic parts in the clamp and becomes an integral part thereof, and a flexibility is retained so that the arm 46 may be repeatedly operated without any rupture of the coating portion 54 between the arm 46 and the body 18. The overall flexibility of the coating also permits a separation of the arms 20, 22 or a drawing thereof together without any breakage in the continuity of the coating, and the coating 52 may extend continuously from the clamp portion along the lead 14 a predetermined distance, so that there is no corrosion accumulated on the clamp nor on the lead adjacent the clamp.

There results herein a battery terminal clamp completely sheathed by an adherent insulation coating which may be extended as desired, which coating not only completely protects the clamp but permits full operation of the arm 46, which usually is approximately a 90° turn. Even a repeated operation of the arm through its 90° cycle in no way affects the coating portion 54.

Additionally butanol, a synthetic rubber-like plastic, may be obtained in colors so that positive and negative connections may be readily identified.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed and desired to secure by United States Letters Patent is:

In an electric lead terminal for frictionally engaging the terminal post of a battery comprising a bifurcated body having a round opening adapted to receive said battery post, said bifurcated body providing a pair of substantially parallel lugs having axially aligned apertures, a sleeve having an internally threaded bore and an externally plain bearing surface at one end, and an externally threaded portion at the opposite end, said sleeve being received in one of said apertures with the externally threaded portion thereof arrayed to project from within to beyond the opposite side of said lug, a collar on one end of said sleeve for engaging one side of said lug, a nut received on said externally threaded portion of said sleeve to coact with said collar for clamping the lug therebetween, thereby permitting locking of the sleeve with respect to said lug, a clamping screw having right and left hand externally threaded end portions with the left hand thread received in the correspondingly internally threaded bore in said sleeve, and the right hand threaded portion received in a correspondingly threaded aperture in the other lug, a key portion terminally carried by said screw member an operating arm engaging said key portion to rotate said right and left threaded screw member, the thread on said screw member and the external threads on said sleeve being of a different pitch to produce a self-locking action between the nut and sleeve when the screw member is turned in a direction to tighten and loosen said lugs, said sleeve being adapted to be rotated when said nut is released to permit longitudinal adjustment of the sleeve on said screw members, and a sheath covering all the exposed surfaces of said terminal, said sheath having an elasticity to retain its sheathing properties while permitting repeated adjustments of the parts enclosed therein by at least a 90° rotation of said operating arm.

References Cited in the file of this patent

UNITED STATES PATENTS

| | | |
|---|---|---|
| 1,847,924 | Calderwood | Mar. 1, 1932 |
| 2,299,291 | Zam | Oct. 20, 1942 |
| 2,324,082 | Helm | July 13, 1943 |
| 2,683,766 | Cunningham | July 13, 1954 |